US012620763B2

(12) United States Patent
Herr

(10) Patent No.: US 12,620,763 B2
(45) Date of Patent: May 5, 2026

(54) APPARATUS AND METHOD FOR GENERATING ELECTROMAGNETIC USEFUL RADIATION

(71) Applicant: Fraunhofer-Gesellschaft zur Förderung der angewandten Forschung e.V., Munich (DE)

(72) Inventor: Simon J. Herr, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 613 days.

(21) Appl. No.: 18/031,543

(22) PCT Filed: Oct. 13, 2021

(86) PCT No.: PCT/EP2021/078259
§ 371 (c)(1),
(2) Date: Apr. 12, 2023

(87) PCT Pub. No.: WO2022/079078
PCT Pub. Date: Apr. 21, 2022

(65) Prior Publication Data
US 2023/0378707 A1 Nov. 23, 2023

(30) Foreign Application Priority Data
Oct. 14, 2020 (EP) .................................... 20201837

(51) Int. Cl.
*H01S 3/00* (2006.01)
*H01S 3/06* (2006.01)
(Continued)

(52) U.S. Cl.
CPC .......... *H01S 3/0085* (2013.01); *H01S 3/0627* (2013.01); *H01S 3/063* (2013.01); *H01S 3/1671* (2013.01)

(58) Field of Classification Search
CPC ...... H01S 3/0085; H01S 3/0627; H01S 3/063; H01S 3/1671
See application file for complete search history.

(56) References Cited

U.S. PATENT DOCUMENTS

| 7,813,390 B2 * | 10/2010 | Luo ..................... H01S 3/10092 |
| | | 372/6 |
| 8,724,671 B2 * | 5/2014 | Moore .................. H01S 5/0615 |
| | | 372/12 |

(Continued)

OTHER PUBLICATIONS

M. H. Asadian, Y. Wang and A. M. Shkel, "Design and Fabrication of 3D Fused Quartz Shell Resonators for Broad Range of Frequencies and Increased Decay Time," 2018 IEEE Sensors, New Delhi, India, 2018, pp. 1-4. (Year: 2018).*

(Continued)

*Primary Examiner* — Rhonda S Peace
(74) *Attorney, Agent, or Firm* — MEDLER FERRO WOODHOUSE & MILLS PLLC

(57) ABSTRACT

A method for generating an electromagnetic useful radiation having a useful frequency is provided and includes generating and radiating an electromagnetic pump radiation with a pump frequency, coupling the pump radiation into an external optical resonator having a resonance frequency. The resonance frequency is at least initially substantially equal to the pump frequency, such that resonator electromagnetic radiation oscillates in the resonator at the resonance frequency. The method further includes temporally, after coupling the pump radiation, changing the resonance frequency of the resonator so that the resonance frequency of the resonator radiation oscillating in the resonator is changed over a tuning bandwidth, wherein the pump frequency does not follow the change in resonance frequency, decoupling of the resonator radiation as useful radiation with the useful frequency different from the pump frequency from the (Continued)

resonator, pumping of an amplifying medium arranged in the resonator; and amplifying the resonator radiation oscillating in the resonator in the amplifying medium. The amplification is smaller than a threshold amplification required by the resonator and the amplifying medium for a laser action of the resonator.

14 Claims, 1 Drawing Sheet

(51) Int. Cl.
  *H01S 3/063* (2006.01)
  *H01S 3/16* (2006.01)

(56) References Cited

U.S. PATENT DOCUMENTS

| | | | | |
|---|---|---|---|---|
| 9,190,798 | B2 * | 11/2015 | Caprara | ................ H01S 3/0092 |
| 10,928,200 | B1 * | 2/2021 | Wu | ................... H01S 3/094076 |
| 2009/0059968 | A1 | 3/2009 | Luo et al. | |
| 2013/0064262 | A1 * | 3/2013 | Kopf | ....................... H01S 5/183 |
| | | | | 372/39 |
| 2013/0195128 | A1 | 8/2013 | Moore | |

OTHER PUBLICATIONS

Breunig et al., "Tunable single-frequency lasing in whispering gallery resonators," SPIE LASE, vol. 11266, Mar. 2, 2020, pp. 112660Q-112660Q.

European Search Report for EP Patent Application No. 20201837.0, Issued on Mar. 31, 2021, 7 pages.

International Search Report and Written Opinion received for PCT Patent Application No. PCT/EP2021/078259, mailed on Jan. 20, 2022, 18 pages (3 pages of English Translation and 15 pages of Original Document).

Jiang et al., "Optothermal dynamics in whispering-gallery microresonators," Light: Science & Applications, vol. 9, No. 24, Feb. 24, 2020, pp. 1-15.

* cited by examiner

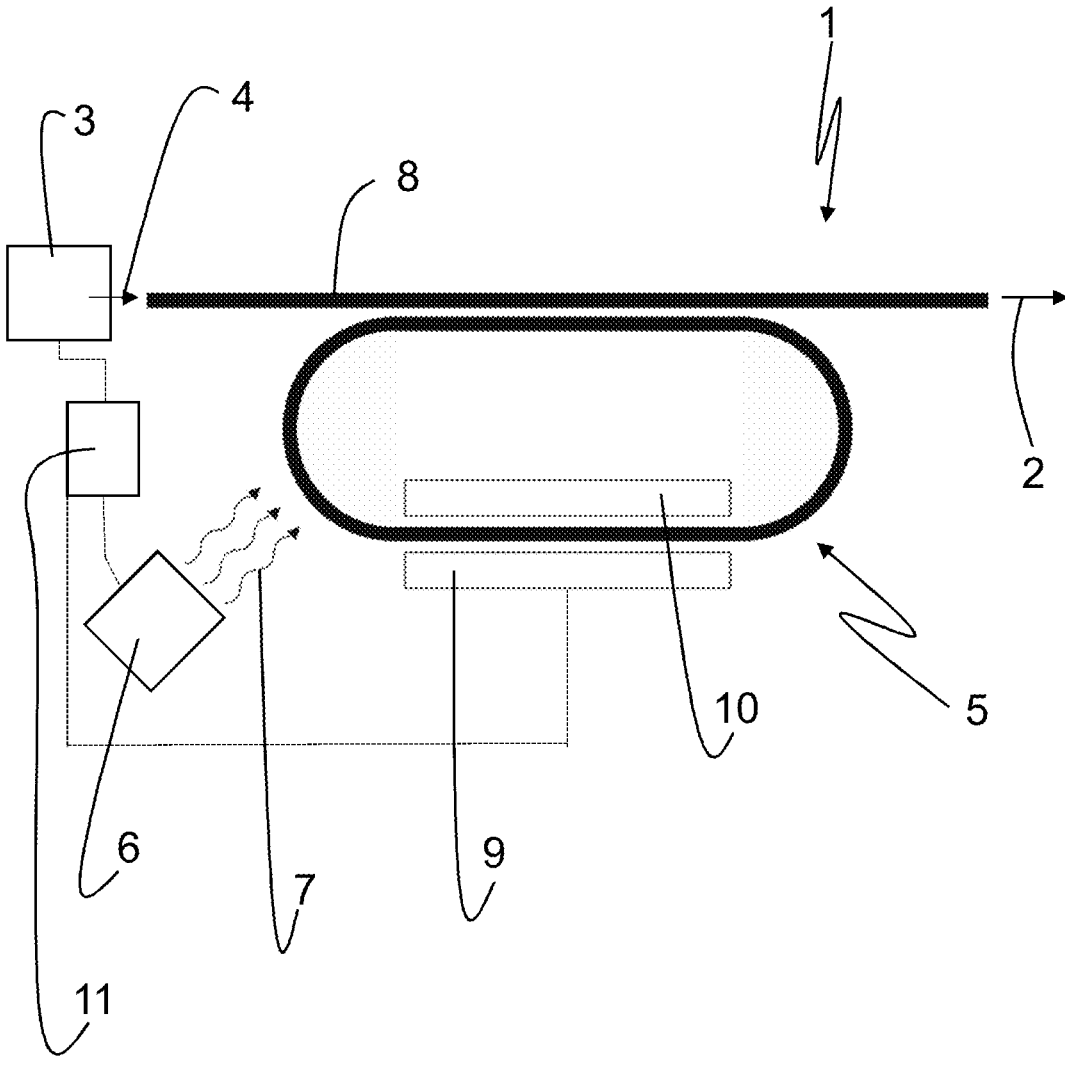

APPARATUS AND METHOD FOR GENERATING ELECTROMAGNETIC USEFUL RADIATION

CROSS REFERENCE TO RELATED APPLICATIONS

This application is a National Stage of International Application No. PCT/EP2021/078259 filed Oct. 13, 2021, which claims benefit of European Patent Application No. 20 201 837.0 filed Oct. 14, 2020, both of which are herein incorporated by reference in their entirety.

The present invention relates to a method for generating an electromagnetic useful radiation comprising a useful frequency, the method comprising the steps of: a) generating and emitting an electromagnetic pump radiation comprising a pump frequency, b) coupling the pump radiation into an external optical resonator, which external optical resonator comprises a resonance frequency, wherein the resonance frequency is at least initially substantially equal to the pump frequency, such that an electromagnetic resonator radiation oscillates in the resonator at the resonance frequency, c) temporally after step b) changing the resonance frequency of the resonator such that the resonance frequency of the resonator radiation oscillating in the resonator is changed over a tuning bandwidth, wherein the pump frequency does not follow the change of the resonance frequency, and d) coupling the resonator radiation out of the resonator as the useful radiation comprising the useful frequency different from the pump frequency.

Optical resonators of this type are used in a variety of photonic devices. It proves to be problematic, especially for resonators which are pumped once, i.e. over a fixed time interval, with the pump radiation, that the possible period of use of the useful radiation coupled out of the resonator is determined by a decay time $\tau$ of the resonator. Here, the decay time $\tau$ is given as $\tau = Q\lambda/(2\pi c)$, wherein Q is the Q factor of the resonator, $\lambda$ is the vacuum wavelength of the resonator radiation in the resonator, and c is the vacuum light velocity. In lithium niobate microresonators a few millimeters in size, Q factors on the order of $10^8$ are typically achieved, corresponding to decay times, i.e. periods of use in the range of about 100 ns. For chip-integrated microresonators, the achievable Q factors are currently significantly lower. Although the optical resonator can be pumped again, the useful radiation then oscillating in the resonator again only has a period of use of about 100 ns.

In contrast, the present invention is directed to providing a method and an apparatus for generating an electromagnetic useful radiation with an increased period of use.

To solve this task, a method is proposed according to the invention, comprising the steps:
a) generating and emitting an electromagnetic pump radiation comprising a pump frequency,
b) coupling the pump radiation into an external optical resonator, which external optical resonator comprises a resonance frequency, the resonance frequency being at least initially substantially equal to or equal to the pump frequency, such that resonator electromagnetic radiation oscillates in the resonator at the resonance frequency,
c) temporally after step b) changing the resonance frequency of the resonator so that the resonance frequency of the resonator radiation oscillating in the resonator is changed over a tuning bandwidth, wherein the pump frequency does not follow the change in resonance frequency, and d) coupling of the resonator radiation out of the resonator as useful radiation comprising a useful frequency different from the pump frequency,
e) pumping of an amplifying medium arranged in the resonator, and
f) amplifying the resonator radiation oscillating in the resonator in the amplifying medium, wherein an amplification is smaller than a threshold amplification required by the resonator and the amplifying medium for a laser action of the resonator.

According to the present invention, electromagnetic tunable useful radiation or useful radiation tunable with respect to the useful frequency is provided. For this purpose, the resonance frequency of the resonator and thus the frequency of the resonator radiation oscillating in the resonator as well as the useful frequency of the useful radiation coupled out of the resonator are adiabatically changed during the period of use. In this way, a spectrally tunable source is provided. Therefore, the optical resonator comprises a tunable resonance frequency.

The useful radiation provided in this way can be reliably tuned over a wide frequency range without the need for tuning of the pump radiation. Therefore, no mode jumps occur during tuning, which would otherwise lead to uncontrolled generation of useful radiation.

In an embodiment, the tuning duration is substantially equal to the period of use of the useful radiation. Here, the tuning duration is the time required to tune the resonance frequency starting from the pump frequency over the entire tuning bandwidth provided by the resonator to a maximum useful frequency spaced from the pump frequency. In this context, the period of use of the useful radiation is the time period during which time period the power of the useful radiation decoupled from the resonator is reduced to 1/e (i.e. to about 37%).

The change of the useful frequency starting from the pump frequency is based exclusively on a change or tuning of the resonance frequency of the resonator. In an embodiment of the invention, no optical parametric processes take place in the resonator.

The basic concept of the present invention is to increase the decay time $\tau$ of the optical resonator by amplifying the resonator radiation oscillating in the resonator below the laser threshold. In this way, the initially limited Q factor of the resonator can be compensated and the period of use of the useful radiation coupled out of the resonator is extended. One could also speak of a synthetic increase of the Q factor of the resonator.

It is essential for the present invention that the amplification of the resonator radiation in the amplifying medium is below the threshold amplification (laser threshold) required for the resonator to operate as a laser. This ensures that no further resonator modes resonate. The resonator radiation and thus also the useful radiation coupled out of the resonator are thus longitudinally and transversely single-mode.

By extending the decay time and thus the period of use of the useful radiation emerging from the resonator, the applicability of the resonator is significantly increased. In particular, in the case of tunability of the useful radiation by an adiabatic tuning of the resonance frequency, this tuning does not have to be carried so fast anymore, such that, for example, "slower" electronics can be used. Furthermore, it is expected that the light can be spectrally tuned much further, i.e. over a wider tuning bandwidth. Thus, chip-integrated microresonators can also be used in a technically useful way for adiabatic frequency tuning.

In an embodiment, the tuning bandwidth of the resonator is within an amplifying bandwidth of the amplifying medium. In another embodiment of the invention, a center frequency of a pump frequency bandwidth of the pump radiation is also within the amplifying bandwidth of the amplifying medium.

For the purposes of the present application, an external resonator is a resonator provided external to and in addition to a first radiation source, the first radiation source generating and radiating electromagnetic pump radiation for pumping the external resonator, the pump radiation being coupled into the external resonator.

When the term pump radiation is used in this application, it refers to the electromagnetic radiation which is initially coupled into the external optical resonator. This pump radiation can also be called seed light comprising a seed frequency. This is to be distinguished from amplifying pump radiation, which in an embodiment is used to optically pump the amplifying medium.

Generation of the electromagnetic pump radiation in step a) of the method according to the invention is carried out using conventional electromagnetic radiation sources known from the prior art, such as a laser. The generated and emitted pump radiation according to the invention is coupled into the external optical resonator.

In order for the electromagnetic pump radiation generated and emitted in step a) to oscillate in the external optical resonator, the resonance frequency of the external optical resonator is substantially equal to the pump frequency of the electromagnetic pump radiation, at least initially.

After the electromagnetic pump radiation is coupled into the external optical resonator, it oscillates at the resonance frequency of the external optical resonator and is therefore referred to as electromagnetic resonator radiation from this point on.

The pump frequency and the resonance frequency of the resonator being at least initially the same or substantially the same means that at the beginning of the processes under consideration, i.e. during pumping of the resonator, this identity must be provided, but in embodiments described in more detail below, a change in the resonance frequency under consideration may occur so that then at a later time the resonance frequency under consideration is different from the pump frequency.

As soon as the resonator radiation has left the external optical resonator, it is referred to as useful radiation in the sense of the present invention, which can be used for subsequent applications, such as distance measurement.

In an embodiment of the invention, the resonator is a microresonator. In particular, such a microresonator is a resonator with a transverse mode diameter of 10,000 $\lambda^2$ or less, preferably of 1,000 $\lambda^2$ or less, and more preferably of 500 $\lambda^2$ or less, wherein $\lambda$ is the vacuum wavelength of the resonator radiation in the resonator.

In an embodiment of the invention, the resonator is configured such that light guidance occurs by a shape, structure, or texture of a material, wherein resonator electromagnetic radiation propagates in the resonator in this material. In an embodiment of the invention, the resonator comprises light conduction or guidance in a waveguide, preferably in a ridge waveguide. In a further embodiment, the resonator is a whispering gallery resonator, wherein the resonator is monolithically made of a material transparent to the resonator radiation and formed such that the resonator radiation is guided and propagates in the material.

In an embodiment of the invention, the resonator comprises the amplifying medium, wherein the amplifying medium is shaped, structured, or configured such that the amplifying medium provides light guidance of the resonator radiation and the resonator radiation propagates through the amplifying medium.

In an embodiment of the invention, the amplifying medium is a four-level laser medium. In such an embodiment, the transparency of the amplifying medium to the resonator radiation to be amplified is independent of the amplifying pump power. This increases the efficiency of the setup.

According to the invention, after coupling the pump radiation into the external optical resonator, the resonance frequency of the external optical resonator is changed over a tuning bandwidth in a step c) following step b). I.e. the coupling of the pump radiation into the external optical resonator takes place at least also temporally before the change of the resonance frequency of the external optical resonator. This ensures that electromagnetic pump radiation has already been coupled into the resonator at the start of the change in the resonance frequency and is oscillating in the resonator as resonator radiation.

Changing the resonance frequency of the external optical resonator is adiabatic, i.e. the tuning steps over which the resonance frequency is tuned and also the tuning bandwidth over which the resonance frequency is maximally tunable are small compared to the frequencies of the electromagnetic radiation involved in the process.

It is envisaged that the change of the resonance frequency also takes place in such a way that the pump frequency of the electromagnetic pump radiation does not follow the change of the resonance frequency. That is, generation and emission of the electromagnetic pump radiation in step a) occur independently of the change in resonance frequency in step c). In an embodiment of the invention, the pump frequency is substantially constant, preferably constant, during the execution of the method.

Thus, at least during the change of the resonance frequency in step c), there is no feedback of the electromagnetic resonator radiation oscillating in the resonator into a radiation source of the electromagnetic pump radiation.

The resonator radiation tuned to the desired resonance frequency in the external optical resonator is coupled out of the external optical resonator as useful radiation with the useful frequency according to the method of the invention. The useful frequency of the useful radiation is determined in the tuning process according to step c). The useful frequency thus differs from the pump frequency of the electromagnetic radiation by a maximum of the tuning bandwidth.

The generation of the electromagnetic useful radiation in an external optical resonator independent of a radiation source and the exclusion of a feedback of the tuned resonator radiation or of the generated useful radiation, in particular during a change of the resonance frequency according to an embodiment of the invention, offers the advantage that the useful radiation generated in this way is independent of the properties of the electromagnetic radiation source, since the generation of the useful radiation, but in particular the tuning of the resonator radiation, is performed independently of the radiation source. Therefore, the method according to the invention does not cause any mode jumps, which usually occur, for example, when tuning the active medium of a laser, since tuning of the radiation source for the electromagnetic pump radiation is not necessary according to the invention.

As a consequence, the method according to the invention allows a reproducible and stable generation of electromagnetic useful radiation comprising a useful frequency identical to the pump frequency of the pump radiation used for generation or a useful frequency different from the pump frequency. Resonator radiation oscillating in the external optical resonator is always single-mode and therefore stable with respect to its amplitude, since a jump to another mode different in resonance frequency is physically impossible even during tuning of the resonance frequency of the external optical resonator.

Since there is no feedback into the radiation source of the electromagnetic pump radiation during the tuning process, tuning is possible over a comparatively large frequency range without mode jumps, since the tuning is performed independently of the active medium of the radiation source.

In an embodiment of the invention, the pump frequency of the electromagnetic pump radiation is constant during the coupling of the electromagnetic pump radiation into the external optical resonator in step b). This is particularly to be ensured when neither tuned resonator radiation nor generated useful radiation is coupled back into the pump radiation source.

In a further embodiment of the invention, it is not excluded that pump radiation continues to be coupled into the external optical resonator while the resonance frequency is being changed. However, feedback of the resonator radiation into the electromagnetic radiation source is excluded at this time.

In another embodiment of the invention, the coupling of the pump radiation into the external optical resonator is interrupted in time before step c), i.e. before the resonance frequency is changed.

In principle, the method according to the invention is independent of how the pumping of the amplifying medium is carried out. The pumping can, for example, be an electrical pumping of the amplifying medium.

In an embodiment of the invention, pumping of the amplifying medium is performed optically by illumination by a radiation source. In this case, a light source is used for pumping the amplifying medium, as known from the prior art. In this embodiment of the invention, pumping the amplifying medium comprises the steps of: generating and emitting an electromagnetic amplifying pump radiation comprising an amplifying pump power; and illuminating the amplifying medium with the amplifying pump radiation, wherein the amplifying pump power is less than a threshold pump power required for laser operation of the resonator. In an embodiment of the invention, the amplifying pump radiation comprises an amplifying pump frequency, wherein the amplifying pump frequency is different from the pump frequency.

In an embodiment, the resonator is absorbing at the amplifying pump frequency of the amplifying pump radiation. Described in other words, the Q factor of the resonator is low at the amplifying pump frequency. Therefore, in such an embodiment, the amplifying pump radiation can be efficiently coupled into the resonator even with a large linewidth. This in turn allows the use of a broadband radiation source, in particular a light emitting diode or a broadband laser diode.

In an embodiment, the change in resonance frequency of the external optical resonator occurs due to a change in the optical resonator length of the resonator. This can be achieved, for example, by the external optical resonator comprising a resonator material with an electro-optical effect. When an external voltage is applied to such a resonator material, the optical properties, in particular the refractive index, of the external optical resonator change and thus the optical path length and the resonance frequency of the external optical resonator also change.

Thus, in an embodiment of the invention, the resonator comprises an electro-optic material, wherein the resonator radiation propagates through the electro-optic material in the resonator, and wherein changing the resonance frequency comprises the steps of: Applying a voltage to the electro-optic material and changing the voltage.

In an embodiment of the invention, the electro-optic material completely fills the resonator in the sense that the resonator radiation oscillating in the resonator propagates only in the electro-optic material. The longer the interaction length between the resonator radiation and the electro-optic material, the more efficiently the resonance frequency of the resonator can be tuned. For example, the resonator in this case is a linear resonator formed by a ridge waveguide made of the electro-optic material, with the end facets of the ridge waveguide serving as resonator mirrors. In another embodiment, the resonator is a whispering gallery resonator formed from the electro-optic material.

In another embodiment, the change in resonance frequency is primarily due to a linear electro-optical effect (Pockels effect), so that a change in resonance frequency due to non-linear electro-optical effects is negligible. This also serves to reliably tune the useful frequency of the useful radiation in a reproducible and linear manner.

In an embodiment of the invention, the amplifying medium is identical to the electro-optic material, the amplifying medium in an embodiment being formed by a rare earth ion doped lithium niobate or lithium tantalate. This material exhibits both sufficient gain and sufficient electro-optic effect to change the resonator length.

In an embodiment of the invention, the amplifying pump frequency is equal to or larger than 300 THz.

In another embodiment of the invention, the pump frequency is in a frequency range of 274 THz to 278 THz.

In a further embodiment, the coupling of the electromagnetic resonator radiation as useful radiation out of the resonator in step d) occurs simultaneously with the changing of the resonance frequency of the external optical resonator in step c). This results in permanently coupling out resonator radiation as useful radiation with a useful frequency, whereby the useful frequency varies depending on the point of time of the coupling out, since the tuning process continues to progress. Thus, over the duration of the tuning of the resonance frequency, useful radiation with a plurality of useful frequencies that lie within the tuning bandwidth of the external optical resonator is coupled out one after the other.

In an embodiment, the useful frequencies generated in time succession cover a continuous frequency spectrum within the tuning bandwidth. In another embodiment, the useful radiation is only decoupled from the external optical resonator after the tuning of the resonance frequency is complete and the resonance frequency has reached a predetermined target value. Thus, in an embodiment of the invention, the external resonator includes a Q-switch configured and arranged to couple radiation out of the resonator only after the target frequency has been reached during tuning.

In a further embodiment of the invention, steps b), c) and d) are repeated periodically. Thus, an electromagnetic useful radiation with a certain useful frequency can be provided at certain time intervals which depend on the repetition rate of the steps. The useful radiation generated in this embodiment may be referred to as pulsed radiation, the repetition rate of which depends on the repetition rate of the process.

In an embodiment of the invention, in step c), the tuning bandwidth is larger than a pump frequency bandwidth of the pump radiation. In another embodiment of the invention, the coupling of the pump radiation into the resonator is interrupted during step c).

The aforementioned object is also solved by a device for generating electromagnetic useful radiation comprising a useful frequency, the device comprising: a first radiation source configured such that in an operation of the device the first radiation source generates and emits electromagnetic pump radiation comprising a pump frequency, an external optical resonator, and a controller, the resonator being arranged and configured so that the resonator has a tunable resonance frequency, so that, in the operation of the device, the pump radiation emitted by the first radiation source is coupled into the resonator and so that, in the operation of the device, the useful radiation is coupled out of the resonator, the controller being operatively coupled to at least one of the first electromagnetic radiation source and the resonator and the controller being arranged so that, in the operation of the device, the controller adjusts at least one of the pump frequency and the resonance frequency such that the resonance frequency is at least initially substantially equal to the pump frequency, so that in the resonator an electromagnetic resonator radiation oscillates at least initially with the resonance frequency, and then changes the resonance frequency of the resonator and thus the useful frequency of the useful radiation over a tuning bandwidth, the device being arranged such that the pump frequency does not follow a change of the resonance frequency, the device further comprising a pumping means and an amplifying medium, the amplifying medium being arranged in the resonator such that in operation of the device the amplifying medium is pumped by the pumping means and the resonator radiation is amplified in the amplifying medium, the amplification being less than a threshold amplification required by the resonator and the amplifying medium for laser operation of the resonator.

It can be seen that this device is particularly suitable for carrying out the method according to embodiments described above.

Insofar as the method is carried out using a device according to the present invention, this device has the corresponding facilities therefor. Insofar as aspects are described in the following with respect to the device, these also apply to the corresponding method for generating an electromagnetic useful radiation and vice versa.

According to the invention, the resonance frequency of the resonator and the pump frequency must first be substantially equal. Such alignment may be accomplished either by adjusting the pump frequency, or by adjusting the resonance frequency, or by adjusting both the pump frequency and the resonance frequency. Therefore, in an embodiment of the invention in which only the resonance frequency is to be adjusted, the controller is operatively coupled only to the resonator. In an embodiment in which the pump frequency is to be adjusted, the controller is operatively coupled to the resonator and to the first electromagnetic radiation source. In this manner, the controller can both adjust the pump frequency and adjust and change the resonance frequency of the resonator.

In an embodiment of the invention, the resonator has a tunable resonance frequency, the controller being coupled to the resonator such that, in operation of the device, the controller, starting from a resonance frequency substantially equal to the pump frequency, then changes the resonance frequency of the resonator and hence the useful frequency of the useful radiation over a tuning bandwidth.

In an embodiment of the invention, the resonator comprises an electro-optic element comprising an electro-optic material such that an optical resonator length of the resonator and hence the resonance frequency is variable depending on a voltage applied to the electro-optic material, the controller being coupled to the electro-optic element such that, in operation of the device, the controller controls the voltage applied to the electro-optic material and hence the optical resonator length.

In an embodiment of the invention, the electro-optic material is the amplifying medium in the resonator.

In another embodiment of the invention, the resonator comprises a waveguide, in particular an integrated waveguide.

In another embodiment of the invention, a material of the waveguide is the electro-optic material, wherein the electro-optic element comprises a plurality of electrodes for applying the voltage to the electro-optic material, wherein the electrodes are spaced 1 mm or less, preferably 100 µm or less from the waveguide.

A suitable pumping means for the amplifying medium is, for example, a current source that enables electrical pumping of the amplifying medium. In an embodiment of the invention, the amplifying medium is pumped optically. For this purpose, in an embodiment, the device comprises a second radiation source, the second radiation source being configured such that, in operation of the device, the second radiation source generates electromagnetic amplifying pump radiation comprising an amplifying pump frequency and an amplifying pump power, the amplifying medium being arranged in the resonator such that, in operation of the device, the amplifying medium is pumped by the amplifying pump radiation of the second radiation source. Thereby, in an embodiment of the invention, the amplifying pumping power is smaller than a laser pumping threshold power predetermined by the resonator and the amplifying medium. In the parlance of the present application, when the laser pumping threshold power is reached, a laser activity of the resonator starts.

In an embodiment of the invention, the amplifying pump frequency is different from the pump frequency.

Further advantages, features and possible applications of the present invention will become apparent from the following description of an embodiment and the accompanying FIGURE.

FIG. 1 is a schematic top view of an embodiment of a device for generating an electromagnetic useful radiation.

The embodiment of a device 1 for generating electromagnetic useful radiation shown in FIG. 1 is constructed as an integrated source. The elements shown, which carry electromagnetic radiation, are designed as ridge waveguides on a single carrier chip.

The aim of the setup shown in FIG. 1 is to provide electromagnetic useful radiation 2 as an output of the device 1, which can be tuned quickly and linearly over as wide a tuning bandwidth as possible, in a reproducible and repeatable manner. This allows the useful radiation 2 to be used, for example, for distance measurement in an FMCW LIDAR.

In the embodiment shown, the device 1 comprises a first radiation source 3 for electromagnetic pump radiation 4, a resonator configured as a ring resonator 5, and a second radiation source 6 for generating electromagnetic amplifying pump radiation 7.

The pump radiation 4 generated and radiated by the first radiation source 3 has a fixed pump frequency, whereby the pump radiation 4 in the embodiment shown has a vacuum wavelength of 1084 nm. The pump radiation 4 is coupled into the ring resonator 5 via a coupling waveguide 8.

The coupling waveguide 8 is coupled into the resonator 5 in such a way that both pump radiation 4 is coupled into the resonator 5 and useful radiation 2 is coupled out of the resonator 5.

In the variant shown, the material of the ring resonator 5 carrying the electromagnetic radiation 4 is lithium niobate doped with neodymium. This material exhibits a pronounced linear electro-optical effect (Pockels effect). The optical length of the resonator 5 and thus its resonance frequency therefore depends linearly on a voltage applied to the material of the waveguide of the resonator 5. Two elongated electrodes 9, 10 serve to generate a defined electric field. Since a part of the waveguide of the resonator 5 extends between the two electrodes 9, 10, the electric field formed between the electrodes 9, 10 passes through this part of the waveguide. If the voltage applied to the two electrodes 9, 10 is changed, the refractive index of the waveguide forming the resonator 5 between the electrodes changes. However, the refractive index also changes the optical path length of the electromagnetic resonator radiation in the resonator 5 and thus its resonance frequency.

In the embodiment shown, after the pump radiation 4 has been coupled into the resonator 5, the source 3 is switched off or its coupling of the pump radiation 4 into the resonator 5 is interrupted. The controller 11 first sets the resonance frequency of the resonator 5 so that it is substantially equal to the pump frequency of the pump radiation 4. After the pump radiation 4 is coupled into the resonator 5, the controller 11 changes the resonance frequency of the external optical resonator 5 over a predetermined tuning bandwidth by the electric field between the two electrodes 9 and 10. Here, the tuning bandwidth is larger than a pump frequency bandwidth of the electromagnetic pump radiation 4. In the embodiment shown, the tuning bandwidth is 300 GHz.

The useful frequency of the useful radiation 2 coupled out of the resonator 5 follows the tuning of the resonance frequency of the resonator 5. In the embodiment of the device 1 shown in FIG. 1, electromagnetic useful radiation 2 is continuously coupled out so that, over the duration of the tuning, useful radiation 2 is generated with different useful frequencies depending on the time of the coupling out, the useful frequencies lying within the tuning bandwidth of 300 GHz.

After a tuning process has been performed over the tuning bandwidth and electromagnetic useful radiation 2 has been completely decoupled, the process starts again. I.e. pump radiation 4 is again coupled into the external optical resonator 5, the tuning process of the resonance frequency of the external optical resonator 5 begins and resonator radiation is coupled out as useful radiation 2.

It is understood that the guidance of the electromagnetic resonator radiation in the resonator 5 is subject to loss due to the design of the resonator, but also fundamentally due to the coupling of the useful radiation 2 out of the resonator 5. The period of use of the useful radiation 2, which is generated after a single pumping with pump radiation 4 in the resonator 5, and coupled out of the resonator 5, thus directly depends on the Q factor of the resonator 5. To synthetically extend the Q factor of the resonator 5, the neodymium-doped lithium niobate material of the waveguide of the resonator 5 is pumped using a second electromagnetic radiation source 6. For this purpose, the second radiation source 6 generates electromagnetic amplifying pump radiation 7 which excites the material of the waveguide forming the resonator 5. In this way, the material of the waveguide amplifies the resonator radiation. Crucial for increasing the Q factor of the resonator 5 is that the amplifying pump power of the amplifying pump radiation 7 is selected in such a way that no laser activity oscillates in the resonator 5, but only an amplification below the laser threshold occurs. This ensures that no further resonator modes oscillate beyond the selected resonance frequency of resonator 5.

By choosing lithium niobate doped with neodymium as the waveguide material of the resonator 5, it is possible to provide both amplification and electro-optical tunability of the resonator 5 by a single material. Furthermore, it is ensured that the material from which the waveguide of the resonator 5 is made is transparent for the pump radiation 4 and for the resonator radiation, whereby the transparency does not depend on the amplifying pump power of the amplifying pump radiation 7.

For the purposes of the original disclosure, it is pointed out that all features as they become apparent to a person skilled in the art from the present description, the drawings and the claims, even if they have been specifically described only in combination with certain further features, can be combined both individually and in any desired combinations with other of the features or groups of features disclosed herein, unless this has been expressly excluded or technical circumstances make such combinations impossible or pointless. The comprehensive, explicit presentation of all conceivable combinations of features is omitted here only for the sake of brevity and readability of the description.

While the invention has been illustrated and described in detail in the drawings and the foregoing description, this illustration and description is by way of example only and is not intended to limit the scope of protection as defined by the claims. The invention is not limited to the disclosed embodiments.

Variations of the disclosed embodiments will be obvious to those skilled in the art from the drawings, description, and appended claims. In the claims, the word "comprising" does not exclude other elements or steps, and the indefinite article "one" or "a" does not exclude a plurality. The mere fact that certain features are claimed in different claims does not preclude their combination. Reference signs in the claims are not intended to limit the scope of protection.

REFERENCE SIGNS

1 Device
2 useful radiation
3 first radiation source
4 pump radiation
5 resonator
6 second radiation source
7 amplifying pump radiation
8 coupling waveguide
9, 10 electrode
11 controller

The invention claimed is:

1. A method for generating an electromagnetic useful radiation comprising a useful frequency, the method comprising the steps of:

a) generating and emitting an electromagnetic pump radiation comprising a pump frequency;

b) coupling the pump radiation into an external optical resonator, which external optical resonator comprises a resonance frequency, wherein the resonance frequency is at least initially substantially equal to the pump frequency, such that an electromagnetic resonator radiation oscillates in the resonator at the resonance frequency;

c) temporally after step b) changing the resonance frequency of the resonator so that the resonance frequency of the resonator radiation oscillating in the resonator is changed over a tuning bandwidth, wherein the pump frequency does not follow the change in resonance frequency;

d) coupling out the resonator radiation out of the resonator as the useful radiation (2) comprising the useful frequency different from the pump frequency;

e) pumping of an amplifying medium arranged in the resonator; and f) amplifying the resonator radiation oscillating in the resonator in the amplifying medium, wherein an amplification is smaller than a threshold amplification required by the resonator and the amplifying medium for a laser action of the resonator.

2. The method according to claim 1, wherein the resonator is a microresonator.

3. The method according to claim 1, wherein the amplifying medium is a four-level laser medium.

4. The method according to claim 1, wherein the resonator comprises an electro-optic material, wherein the resonator radiation propagates through the electro-optic material, and wherein changing the resonance frequency comprises the steps of applying a voltage to the electro-optic material and changing the voltage.

5. The method according to claim 1, wherein the amplifying medium and the electro-optic material is a rare earth ion doped lithium niobate or a rare earth ion doped lithium tantalate.

6. The method according to claim 1, wherein steps c) and d) are carried out simultaneously or step d) is carried out temporally after step c).

7. The method according to claim 1, wherein in step c) the tuning bandwidth is larger than a pump frequency bandwidth of the pump radiation.

8. The method according to claim 1, wherein during step c) the coupling of the pump radiation into the resonator is interrupted.

9. The method according to claim 1, wherein pumping the amplifying medium comprises the steps of generating and emitting an electromagnetic amplifying pump radiation comprising an amplifying pump power, and illuminating the amplifying medium with the amplifying pump radiation, wherein the amplifying pump power is less than a threshold pump power required for laser operation of the resonator.

10. A device for generating an electromagnetic useful radiation comprising a useful frequency, wherein the device comprises:

a first radiation source configured such that the first radiation source generates and emits electromagnetic pump radiation at a pump frequency in an operation of the device;

an external optical resonator;

a controller;

a pumping means; and an amplifying medium, wherein the resonator is arranged and configured:

so that the resonator has a tunable resonance frequency, so that, in the operation of the device, the pump radiation emitted by the first radiation source is coupled into the resonator, and so that in the operation of the device the useful radiation is coupled out of the resonator, wherein the controller is operatively coupled to at least one of the first electromagnetic radiation source and the resonator and is arranged so that, in the operation of the device, the controller sets at least the pump frequency or the resonance frequency such that the resonance frequency is, at least initially, essentially equal to the pump frequency, such that, in the resonator, an electromagnetic resonator radiation oscillates at least initially at the resonance frequency, and then changes the resonance frequency of the resonator and thus the useful frequency of the useful radiation over a tuning bandwidth, wherein the device is configured such that the pump frequency does not follow a change in the resonance frequency, wherein the amplifying medium is arranged in the resonator so that in the operation of the device the amplifying medium is pumped by the pumping means and the resonator radiation is amplified in the amplifying medium, wherein the amplification is smaller than a threshold amplification required by the resonator and the amplifying medium for a laser action of the resonator.

11. The device according to claim 10, wherein the resonator comprises an electro-optic element, which electro-optic element comprises an electro-optic material such that an optical resonator length of the resonator and thus the resonance frequency is changeable depending on a voltage applied to the electro-optic material, and wherein the controller is coupled to the electro-optic element such that the controller controls the voltage applied to the electro-optic material and thus the optical resonator length in the operation of the device.

12. The device of claim 11, wherein the electro-optic material is the amplifying medium.

13. The device according to claim 10, wherein the resonator comprises a waveguide, preferably an integrated waveguide.

14. The device according to claim 13, wherein a material of the waveguide is the electro-optic material, wherein the electro-optic element comprises a plurality of electrodes for applying the voltage to the electro-optic material, wherein the electrodes are spaced 100 μm or less from the waveguide.

* * * * *